United States Patent [19]

Hirose et al.

[11] Patent Number: 4,794,529

[45] Date of Patent: Dec. 27, 1988

[54] METHOD FOR DISPLAYING OPERATION RANGE OF LOGICAL LANGUAGE

[75] Inventors: Tadashi Hirose, Komae; Kazuo Nakao, Sagamihara; Yoichi Takeuchi, Yokohama; Keiko Shinada, Machida, all of Japan

[73] Assignee: Hitachi, Ltd., Tokyo, Japan

[21] Appl. No.: 895,954

[22] Filed: Aug. 13, 1986

[30] Foreign Application Priority Data

Sep. 6, 1985 [JP] Japan .................................. 60-195848

[51] Int. Cl.⁴ .............................................. G06F 1/00
[52] U.S. Cl. .................................................. 364/300
[58] Field of Search ......................... 364/300, 518, 521

[56] References Cited

U.S. PATENT DOCUMENTS 4,481,602 11/1984 Bohrer et al. .................... 364/300 X

OTHER PUBLICATIONS

Byrd, L., "Understanding the Control Flow of Prolog Programs", *Proc. of Logic Programming Workshop*, 180, pp. 1–12.

Prolog Kaba Reference Manual, Sep. 1984, pp. 1–61.

Numao, M., "A Screen Oriented Prolog Programming Environment", Proc: of the Logic Programming Conference, 1985, pp. 119–128.

Prolog, 1984, pp. 1–6.

Logic Oriented Language Inferencer, 1984, pp. 531–532.

*Primary Examiner*—Raulfe B. Zache
*Attorney, Agent, or Firm*—Antonelli, Terry & Wands

[57] ABSTRACT

In order to improve the efficiency of test and debug procedure based on delarative program understanding of a program described by a logical language, the operation which has been executed for each procedure is grasped. On the basis of information relating to the grasped operation, the operation range of each procedure is expressed clearly by making thick only sides which have actually operated among four sides of a box-shaped figure surrounding each head term and end body term of each clause included in each procedure.

6 Claims, 6 Drawing Sheets

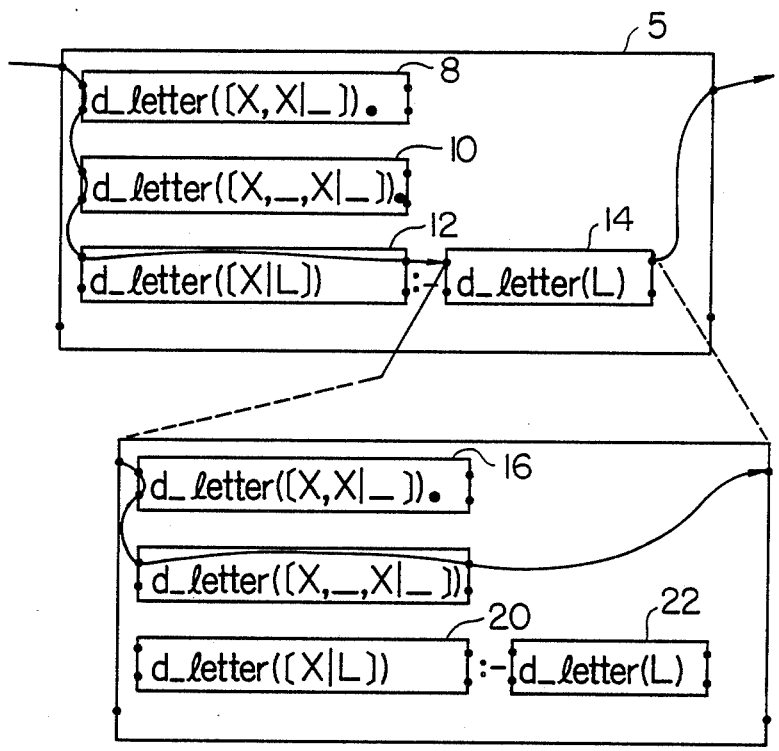

F I G. 3 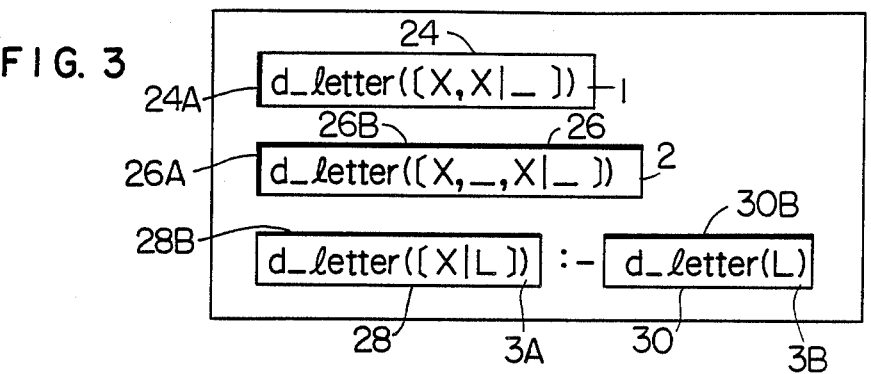
F I G. 4 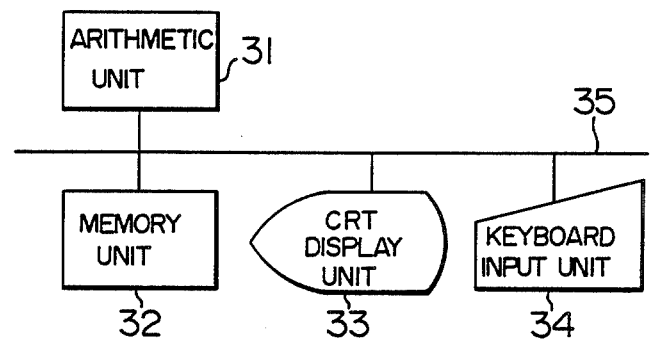
F I G. 5 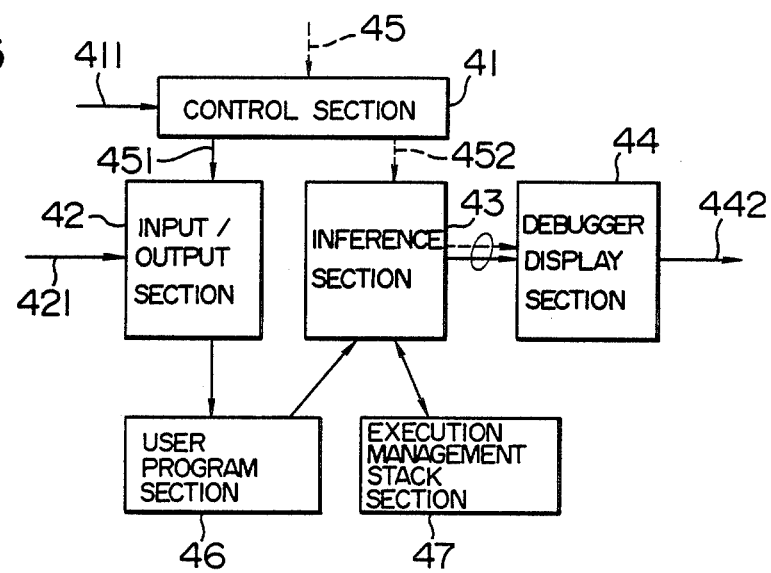

```
I ?- trace, d_letter ([a,b,c,b]).
 ( 1 )   0  Call   d_letter ([a,b,c,b])
 ( 1 )   0  Call   d_letter ([X,X|_])
 ( 1 )   0  Fail   d_letter ([X,X|_])
 ( 1 )   0  Call   d_letter ([X,_,X|_])
 ( 1 )   0  Fail   d_letter ([X,_,X|_])
 ( 1 )   0  Call   d_letter ([X|L])
 ( 1 )   0  Exit   d_letter ([X|L])
 ( 2 )   1  Call   d_letter ([b,c,b])
 ( 2 )   1  Call   d_letter ([X,X|_])
 ( 2 )   1  Fail   d_letter ([X,X|_])
 ( 2 )   1  Call   d_letter ([X,_,X|_])
 ( 2 )   1  Exit   d_letter ([X,_,X|_])
 ( 2 )   1  Exit   d_letter ([b,c,b])
 ( 1 )   0  Exit   d_letter ([a,b,c,b])
   73    74  71           72
```

METHOD FOR DISPLAYING OPERATION RANGE OF LOGICAL LANGUAGE

BACKGROUND OF THE INVENTION

The present invention relates to a test and debug support method for a logical language, and in particular to an operation range display method for a program suitable to test and debug based upon declarative program understanding.

A program understanding method for debugging a logical language is discussed in a paper entitled "Understanding the Control Flow of PROLOG Programs" written by L. Byrd, Research Paper 151, Dept. of Artifical Intelligence, Univ. of Edinburgh (1980). In this paper, an operation grasp model for each procedure taken as a unit is proposed, and the necessity of an operation grasp model for each clause taken as a unit is implied. The operation grasp model for each clause taken as a unit corresponding to this implication is described in Prolog-KABA Reference Manual (1984) published by Iwasaki Electronics Corporation in Japan, for example. Further, operation grasp models (referred to as "clause models") for each clause taken as a unit, for each head term of a clause taken as a unit, and for each body term of a clause taken as a unit are proposed in a paper entitled "Function and Effect of Logical Basic Processing system LONLI" presented by Hirose et al. at the 29th National Conference of the Information Processing Society of Japan (1984).

In any of these papers, however, the problem of the display method of the operation mode on those operation grasp models is not recognized.

As for the display method of the operation mode, a proposal relating to the visual display of the operation process of a logical language is provide in a paper entitled "Diagrammatical Operation Display Method of Prolog" written by Goto, document 27-6, Working Group of Symbol Manipulation, Information Processing Society of Japan (1984). Also, a proposal relating to the display method of the operation grasp model for each clause taken as a unit is made by Numao et al. in a paper entitled "PROEDIT, a screen oriented prolog programming environment", proceedings of the logic programming conference '85 in Japan (1985).

In any of the above described papers, however, support for declarative program undestaning of the program described with a logical language is not considered.

In testing and debugging a program, it is necessary to understand whether the program operates as intended or not. For supporting this understanding, it is desirable that the information supplied by a language processing system matches the program understanding method of the programmer.

As methods for understanding the operation of the program in case of a logical language, there are two methods, i.e., procedural understanding method and declarative understanding method. It can be said that the procedural understanding method provides more minute operation understanding than the declarative understanding. However, the programmer does not always produce a program using only this minute understanding method.

For example, an example of programming using the logical language PROLOG as shown in FIG. 1 is assumed. A PROLOG program comprises one or more procedures, and each procedure comprises one or more clauses. A clause comprises a sequence of one or more terms and the first term of the sequence is called a head term and others are called body terms. The program shown in FIG. 1 comprises one procedure "d-letter" and it has three clauses as designated by numerals 1, 2 and 3. Clauses 1 and 2 are fact clauses. Clause 3 is a rule clause comprising one head term 3A and one body term 3B. A program d-letter (X) determines whether a part of the list includes two consecutive identical elements or two alternate identical elements. This program is more easily understood by using the declarative understanding method described below. A number of programmers produce programs on the basis of this understanding method.

(Clause 1) . . . If the argument X is a list, and the first element in the list is the same as the seoond element, d-letter (X) holds true.

(Clause 2) . . . If the argument X is a list, and the first element in the list is the same as the third elements, d-letter (X) holds true.

(Clause 3) . . . If the argument X is a list, and d-letter (L) holds true on and after the second element of the list, d-letter (X) holds true.

It is assumed that a call
?—d—letter ([a, b, c, d]).
is issued to the above described program. In the prior art, the program operation attendant upon this call is represented by the display of the operation path. FIG. 2 shows an example of display of the operation path when the "clause" model is used. Arrows in FIG. 2 faithfully show the processing procedure of the processing system of the logical language prolog.

When the above program call is issued, clause 1 in the d-letter procedure is executed which results in an unsucce body term of clause 3 is executed, and d-letter procedure is called recursively. The sequence of the above-explained operations are indicated by the arrow passing through the box-shaped figures designated 8, 10, 12 and 14. After the second call of the d-letter procedure, clauses 1 and 2 of the procedure are executed and the execution of clause 2 results in a successful end. These operations are indicated by the arrow passing through the box-shaped figure designated by 16 and 18. That is to say, the arrows are displays corresponding to the procedural understanding method. It is difficult to make these displays correspond to understanding of the above described (clause 1), (clause 2) and (clause 3), i.e., the declarative understanding method. Because the displayed entire operation path extending from the program start to the program end must be tracked for reading out of the display of FIG. 2 the necessary information representing which clause has been used.

SUMMARY OF THE INVENTION

An object of the present invention is to provide a program operation range display method suitable to test and debugging work based upon the declarative program understanding of the program described by the logical language.

The present invention is based upon the fact that the principal information used in the declarative understanding method is the cumulative information obtained by overlapping the operation paths extending from the program start to the program end for, each head term and each body term. In accordance with the present invention, therefore, the operation range is displayed for, each head term and each body term. FIG. 3 shows an example of display according to the present invention when the execution as shown in FIG. 2 has been conducted. The displays are associated with four sides of box-shaped figures surrounding respective terms and are easy for programmers knowing the conventional operation path display (FIG. 2) to learn.

BRIEF DESCRIPTION OF THE DRAWINGS

FIG. 1 shows an example of a program described by using the logical language.

FIG. 2 shows an example of an execution trace using the "clause" model.

FIGS. 3 and 11 show examples of operation range displays according to a method of the present invention.

FIGS. 4 to 6 show the hardware configuration of embodiments according to the present invention.

FIG. 7 shows an example of the trace display output.

DESCRIPTION OF THE PREFERRED EMBODIMENTS

Figures 6, 7:
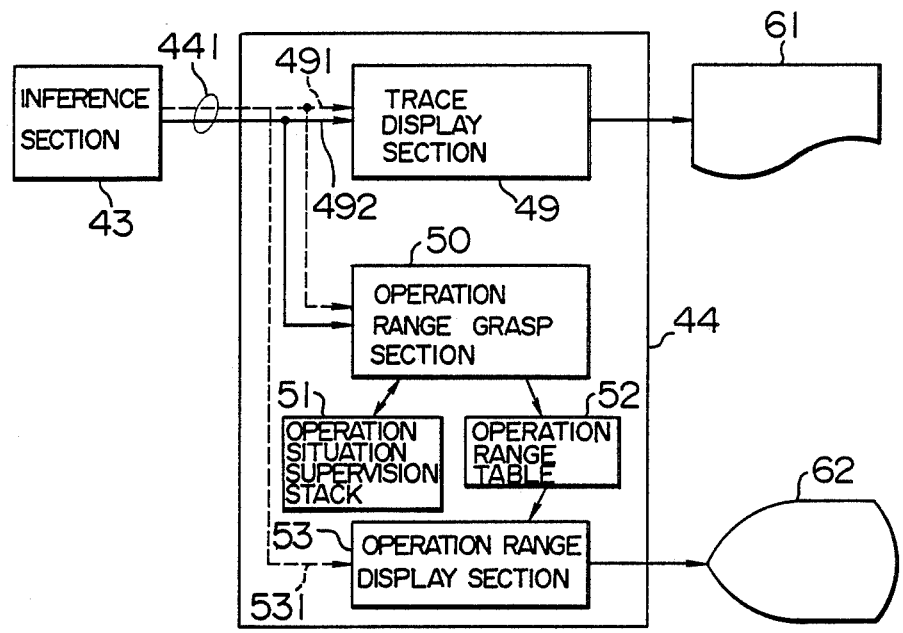

FIG. 4 shows the block configuration of an entire system whereto the present invention is applied. An arithmetic unit 31, a memory unit 32, a CRT display unit 33, and a keyboard input unit 34 are connected via a bus 35.

FIG. 5 shows the software configuration of this embodiment stored in the memory unit 32. A control section 41, an input/output section 42, an inference section 43, a debugger display section 44, a user program section 46 and an execution management stack section 47 are included in the software configuration.

The operation of the whole system will now be described. In FIG. 5, arrows of broken lines represent flow of control signals, and arrows of solid lines represent flow of data signals. The control section 41 is at first activated by a system start signal 45. The control section 41 analyzes a command 411 supplied from the keyboard input unit 34 by the user and issues either a signal 451 for activating the input/output section 42 or a signal 452 for activating the inference section 43. The input/output section 42 stores a program 421 supplied by the user into the user program section 46. The inference section 43 refers to the user program section 46, and produces a solution to a question supplied by the user while using the execution management stack section 47. The debugger display section 44 successively supervises the progress of processing conducted in the inference section 43 and sends the supervision result 442 to the user. The operation of the debugger display section 44 will now be described by referring to FIG. 6.

The debugger display section 44 includes a trace display section 49, an operation range grasp section 50, an operation situation supervision stack 51, an operation range table 52, and an operation range display section 53.

During the execution of the program, the inference section 43 produces a starting signal 491 for the trace display section 49 and the operation range grasp section 50 at the time when the "clause mode" passes through the control point. At the same time, the inference section sends out a signal 492 relating to a class 71 of a transit point shown in FIG. 7, a procedure name 72 during execution, a consistent call number 73 generated whenever a procedure call is produced, and a call level 74 for indicating the nest level of the call. The trace display section 49 traces the signal 492 to successively send out the trace display result 61. FIG. 7 shows output examples of trace displays resulting from applying the operation shown in FIG. 2 to the program of FIG. 1. By using the operation situation supervision stack 51 on the basis of the above described signal 492 spplied from the inference section 43, the operation range grasp section 50 grasps operations executed for each procedure, each head term, and each body term, and records them on the operation range table 52.

When the operation range display indication program is executed independent of the above described control point transit timing, the inference section 43 sends out a start signal 531 to start the operation range display section 53. On the basis of the information recorded in the operation range table 52, the operation range display section 53 displays the operation ranges of each head term and each body term on a display 62 by making thick only those sides which have actually been activated among upper, right, left and lower sides of box-shaped figures surrounding, each head term, and each body term. FIG. 3 shows a display example of operation range for the procedure d-letter (X) derived after the operation shown in FIG. 2.

The head term of first clause 1 has been activated twice which has resulted in no successful end. Therefore, only the left side 24A of the box-shaped figure designated by 24 surrounding the term has been marked thick. The head term of second clause 2 or d-letter procedure has been activated twice which has resulted in a successful end and an unsuccessful end. So, the upper side 26B and left side 26A of the box-shaped figure designated by 26 surrounding the term have been marked thick. The head term 3A and body term 3B of third clause 3 have been activated which has resulted in a successful end. Therefore, the upper sides 28B and 30B of box-shaped figures designated by 28 and 30 surrounding the head term 3A and the body term 3B respectively have been marked thick.

The configuration of the operation situation supervision stack 51 and the operation range table 52 which are deeply related to the present invention will now be described together with details of the processing algorithm of the operation range grasp section 50.

Figure 8A:
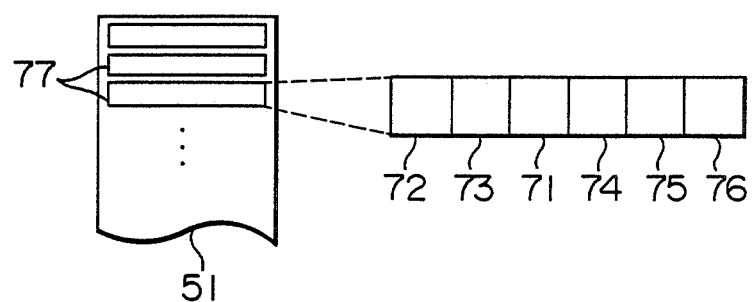
FIGS. 8A and 8B show the configuration of an internal table for producing display data of the present invention.
Figure 8B:
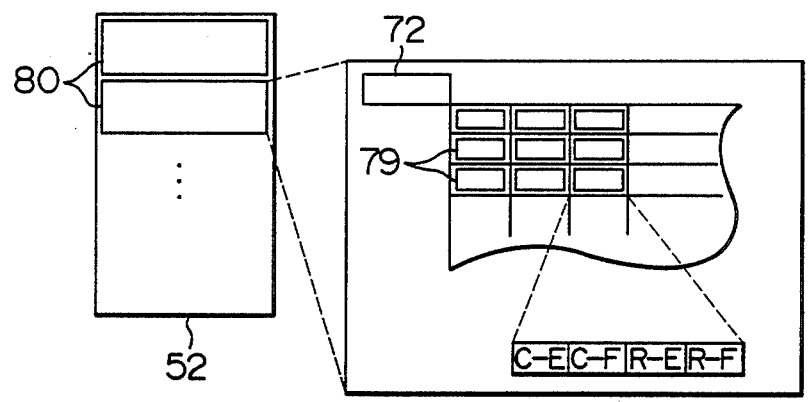

FIG. 8A shows the detailed structure of the operation situation supervision stack 51. FIG. 8B shows the detailed structure of the operatinn range table 52.

Whenever a new procedure call occurs, the operation situation supervision stack 51 stores therein a record 77 composed of six kinds of information. The six kinds of information are a call procedure name 72, a consistent call number 73, a control point class 71 distinguishing between call (hereafter referred to as C), exit (successful end, hereafter referred to as E), redo (recall, hereafter referred to as R), and tail (unsuccessful end, hereafter referred to as F), a call level 74, a current clause number 75 (hereafter referred to as L number) representing the number of clause now under execution, and a current term number 76 (hereafter referred to as C number) representing the number of term now under execution.

The operation range table 52 is composed of a collection of records 80. The record 80 is composed of the procedure name 72 and an arrangement 79 of four kinds of operation flags (C-E, C-F, R-E and R-F flags) for each temm (head term and body term) of each clause included in that procedure. The C-E, C-F, R-E and R-F flags are 1-bit flags set to "1" when C-E, C-F, R-E and R-F operation has been effected upon the corresponding term, respectively.

Figure 9:
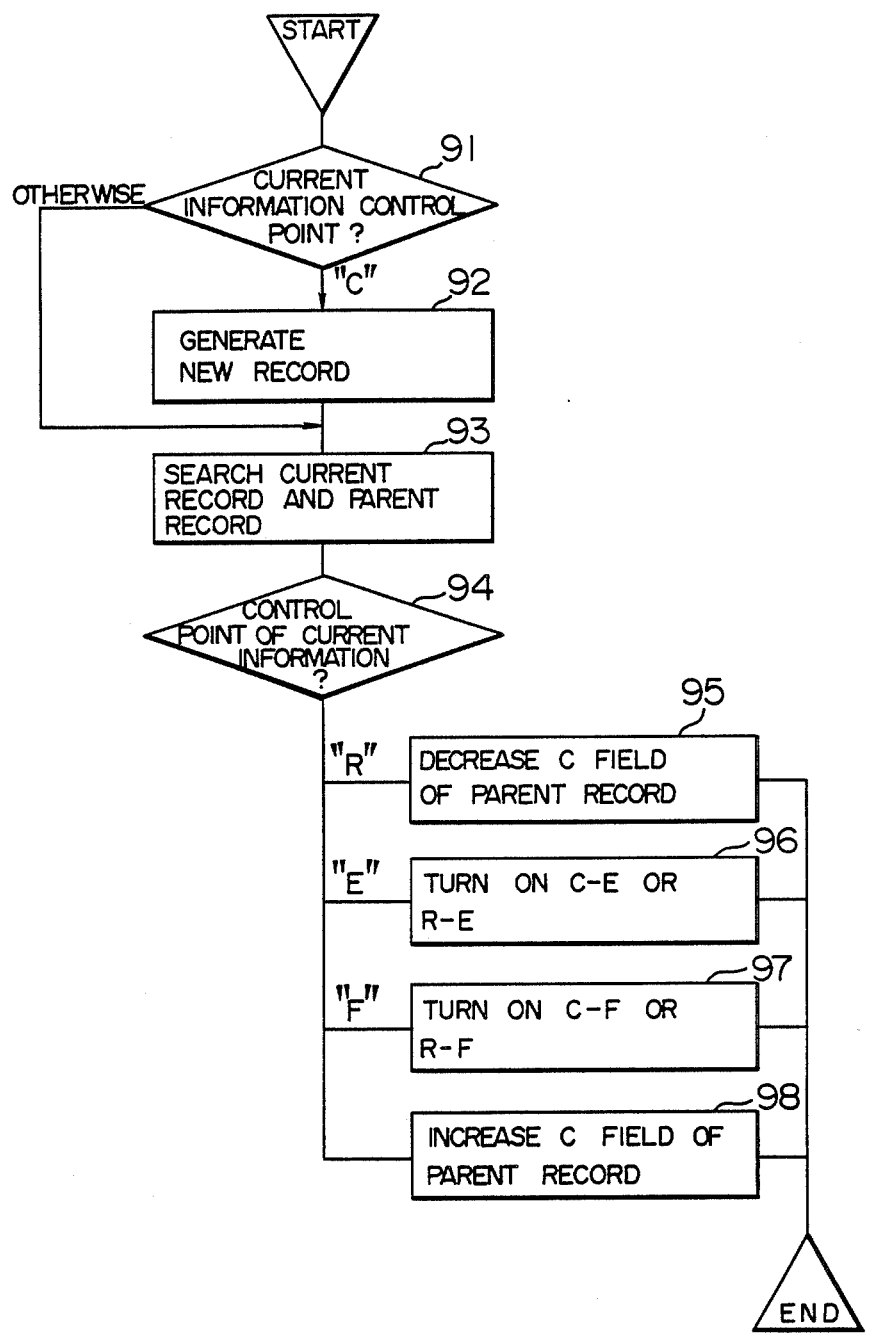
FIG. 9 shows a flow chart of a processing procedure of the internal table configuration.

The processing algorithm of the operation range grasp section 50 will now be described by referring to FIG. 9.

During execution of the program, the operation range grasp section 50 is activated by the inference section 43 when the control point in the "clause model" of the program is passed through. Then the section 50 performs the processing as follows.

Step 91: Determine the control point class 71 of the information supplied from the inference section 43 (hereafter referred to as current information). Proceed to step 2 if the class is C (call) otherwise proceed to step 93.

Step 92: Store the current information into the operation situation supervision stack 51. Set both the L number and C number to 1 and proceed to step 93.

Step 93: Search the operation situation supervision stack 51 for the record 77 having the same number as the consistent call number 72 of the current information. This record is hereafter referred to as current record. Search the operation situation supervision stack 51 from the current record into the lower rank direction (into the direction of older record storage) successively for a record having a call depth less than that of the current record by one. This record is referred to as parent record.

Step 94: Determine the control point class 71 of the current information. If the class is "R", proceed to step 95. If the class is "E", proceed to step 96. If the class is "F", proceed to step 97. Otherwise, proceed to step 98.

Step 95: The control point class of the current record is defined to be "R", and the C number of the parent record is decreased by 1. Thus the processing is completed.

Step 96: Determine the control point class 71 of the current record. If the class is "C", set the operation flag C-E of the operation range table 52 corresponding to the procedure name, L number and C number of the parent record to "1". If the class is "R", set the operation flag R-E to "1". And set the control point class of the current record to "E" to complete the processing.

Step 97: Determine the control point class of the current record. If the class is "C", decrease the number of "1"s included in the operation flag C-F of the execution range table 52 corresponding to the procedure name, L number and C number of the parent record. If the class is "R", decrease the number of "1"s included in the operation flag R-F. If the result becomes zero, increase the L number by 1 and set the C number to 1. And delete the current record to finish the processing.

Step 98: Increase the end of the C number of the parent record by 1 and finish the processing.

Figure 10A:
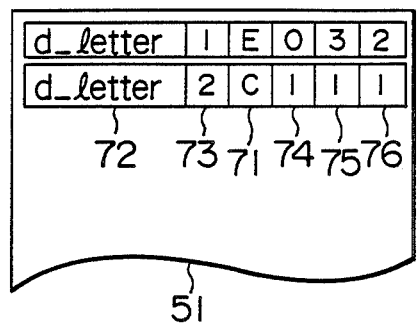
FIGS. 10A and 10B show the contents of the table configuration of FIG. 8 during the operation.
Figure 10B:
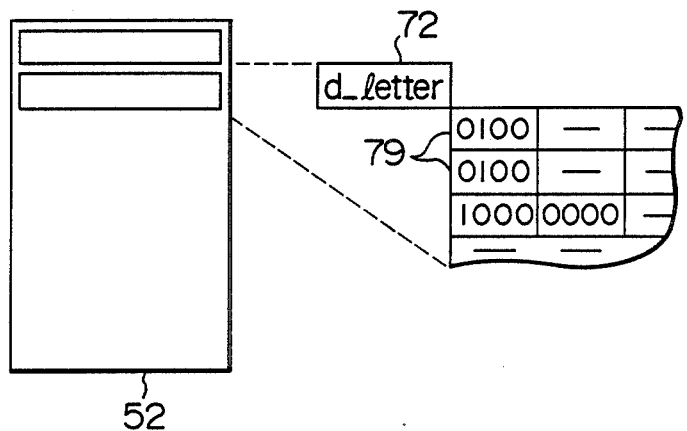

FIGS. 10A and 10B respectively show the contents of the operation situation supervision stack 51 and the operation range table 52 when the operation range grasp section 50 has processed the first information to the eighth information shown in FIG. 7. Since the L number 75 and C number 76 of th first record of the operation situation supervision stack 51 are respectively 3 and 2, it is known that the call source of the second record is the second term of the third clause of the procedure d-letter.

Figure 11:
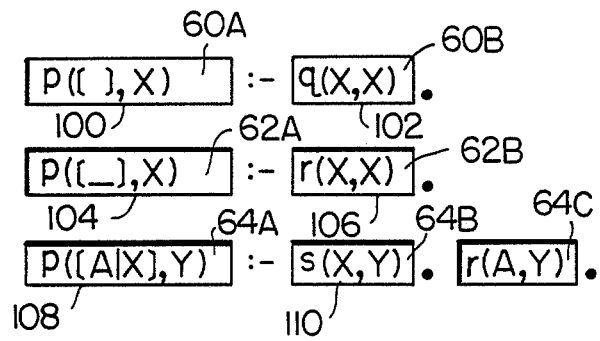

FIG. 11 shows another example of a display of a program execution range derived by the present embodiment.

Procedure p shown in FIG. 11 has three clauses, and the thick sides of box-shaped figures surrounding terms included in these clauses indicate which operations has already been executed. For example, as the upper sides of box-shaped figures designated by 100 and 102 have not been marked thick, it is readily understood from this display that the first clause is not used, and as the right side of the box-shaped figure designated by 110 and the left side of the box-shaped figure designated by 112 have been marked thick, back tracking is incurred one or more times between s (X, Y) and r (A, Y) of the third clause. It is also understood that recall for this predicate has not been effected, and the call for the predicate has not brought about an unsuccessful end.

In accordance with the present invention, the display of the operation range agrees with the declarative understanding method of the program described by a logical language, i.e., the program understanding method based on the standpoint that each clause represents identical facts. That is to say, identical facts which have been used are displayed. As a result, the efficiency in test and debugging work is improved.

We claim:

1. An operation range display method for a system which executes a logical language program which includes one or more procedures, each procedure including one or more clauses, each clause including one or more terms, the method comprising the steps of:
   detecting, in response to execution of each of said terms included in said program, an operation status of said term at a time of execution, said operation status indicating whether said term has been executed by call or redo and whether a result of the execution has been successful or not; and
   displaying said program and corresponding figures, each of said figures being displayed near a corresponding term of said program so that each figure differs depending upon a corresponding operation status at a time of execution thereof thereby enabling the displayed figures to represent respective operation ranges of respective terms of said program.

2. A method according to claim 1, wherein said figure comprises a figure which surrounds said corresponding term.

3. A method according to claim 2, wherein each figure includes a rectangle which surrounds said corresponding term.

4. A method according to claim 3, wherein each side of a rectangle corresponding to a term is displayed in a manner different from a normal display state, when a corresponding operation status predetermined for each side has been detected for a corresponding task.

5. A method according to claim 1, wherein each figure is of a predetermined shape and a different part of each figure is displayed differently from other parts thereof, depending upon said operation statuses detected for said corresponding term.

6. A method according to claim 5, wherein the different part of each figure is displayed with a thicker line than the other parts.

* * * * *